Jan. 28, 1941.  N. J. KAYSER  2,229,894
HYDRAULIC AND AIR WASHING OF SAND FILTERS
Filed April 27, 1938  3 Sheets-Sheet 1

INVENTOR.
NICHOLAS J. KAYSER,
BY
ATTORNEY.

Jan. 28, 1941.  N. J. KAYSER  2,229,894
HYDRAULIC AND AIR WASHING OF SAND FILTERS
Filed April 27, 1938  3 Sheets-Sheet 2

INVENTOR.
NICHOLAS J. KAYSER,
BY
ATTORNEY.

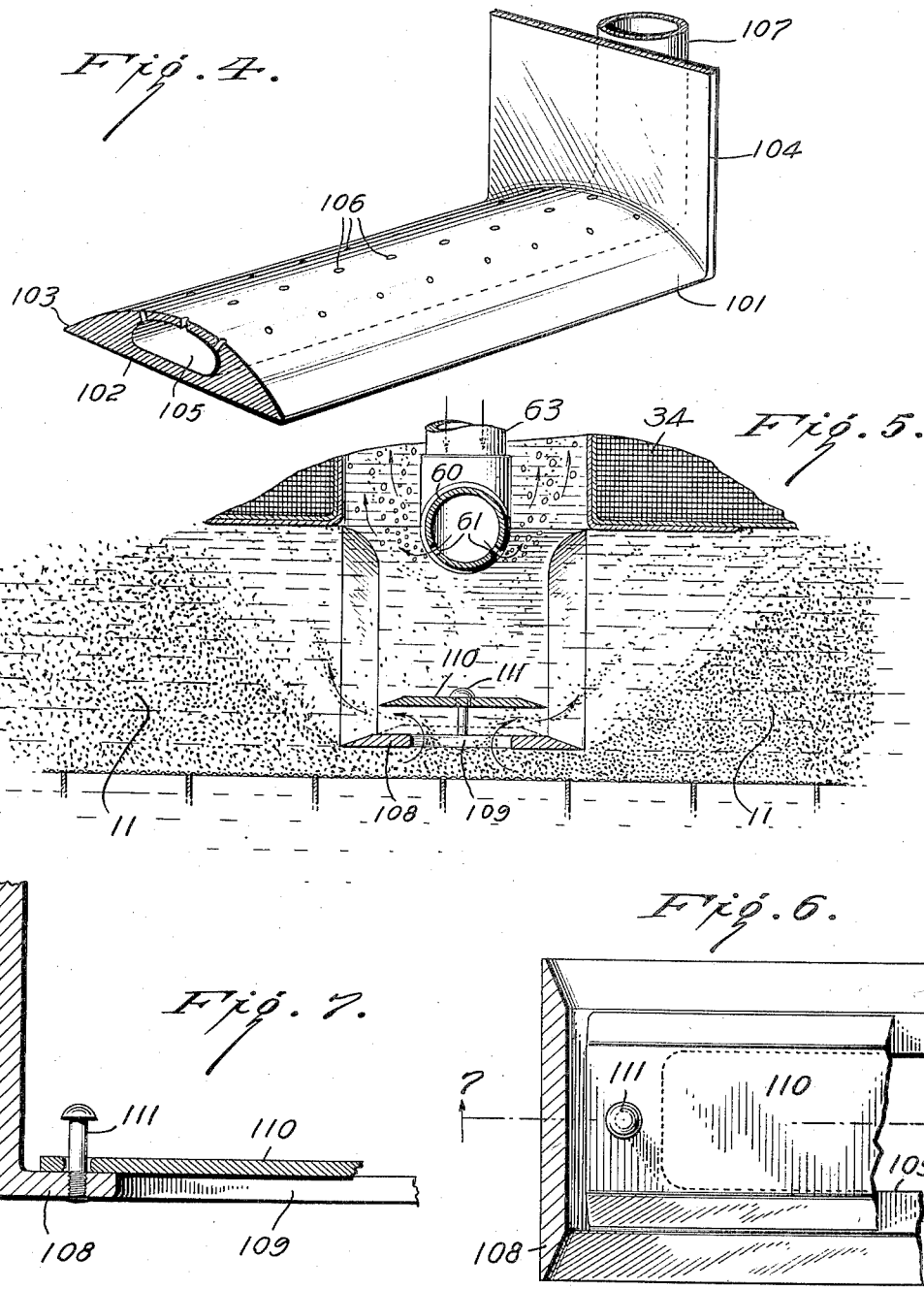

Patented Jan. 28, 1941

2,229,894

UNITED STATES PATENT OFFICE 2,229,894

HYDRAULIC AND AIR WASHING OF SAND FILTERS

Nicholas James Kayser, Mount Vernon, N. Y., assignor to Filtration Equipment Corporation, New York, N. Y., a corporation of Delaware Application April 27, 1938, Serial No. 204,520

5 Claims. (Cl. 210—128)

This invention relates to cleaning mechanisms for sand filters and more particularly to cleaning devices for clarification filters of the type in which a bed of sand is used as the filtering medium. The invention is particularly designed for use in conjunction with cleaning mechanisms for clarification filters of the downflow type, although in its broader aspects it is not limited thereto.

In cleaning sand filters and particularly clarification filters employing a relatively thin bed of sand as the filtering material, it is now the practice to provide traveling cleaners of the type which move continuously or intermittently over the filter bed. Such cleaners are provided with agitators for creating a localized zone of agitation in the sand of the filter in order to release the dirt and accumulated impurities therefrom. The dirt so released is taken up by a stream of water, known as "wash water," which passes into a chamber in the cleaner from which it is preferably continuously discharged by a pump.

The present invention is particularly directed to certain improvements in cleaning devices of the type in which the agitator includes or consists of an electromagnet and the filter bed is a finely divided magnetic material such as magnetite sand. Such a cleaning device is described and claimed, for example, in Patent No. 1,872,759 to Laughlin et al. and the invention will be illustrated by describing a preferred modification as applied to the type of cleaning mechanism described in this patent.

The Laughlin electromagnetic cleaner has come into extensive commercial use on the clarification filters of the upflow type for which it was originally designed. By employing an effluent control weir, as described in the Laughlin et al. Patent No. 1,975,109, this cleaner has also been successfully applied to filters of the downflow type, the control weir serving to create a reverse flow or "back head" which may be used to force a stream of wash water upwardly through the zone of lessened resistance in the filter that is created by operation of the electromagnet. In order to overcome the contamination of the effluent by currents of dirty wash water which flow downwardly from the cleaner tank when the electromagnet is in operation in filters of the down flow type, the provision of a sealing plate has been described in the co-pending application of W. C. Laughlin, Serial No. 167,625, filed October 6, 1937.

It is an object of the present invention to improve the operating efficiency of cleaners of the Laughlin type and particularly those above described, by introducing air into the wash water as it flows upwardly through the filter bed. It is a further object to improve the efficiency of the Laughlin cleaner tank by increasing the effective operating head of the reverse flow. A still further object is the provision of means for injecting air beneath the electromagnet of a Laughlin cleaner provided with a sealing plate in order to overcome the loss of operating head occasioned by this plate. A still further object of the invention is to lessen or prevent the flow of currents of dirty water downwardly from the cleaner by reducing the specific gravity of the wash water after it passes the filter bed. Other objects will be pointed out from time to time in the following description and will be apparent from the appended claims.

The invention will be illustrated in detail by reference to the accompanying drawings, in which:

Figs. 3 and 4 are modified forms of the Laughlin sealing plate which are designed in accordance with the present invention for improved operation.

Fig. 5 is a fragmentary side elevation partly in section of the parts adjacent to the zone of agitation.

Fig. 6 is a partial plan view of a modified form of valved sealing plate, and

Fig. 7 is a sectional view along the line 7—7 of Fig. 6.

Figure 1:
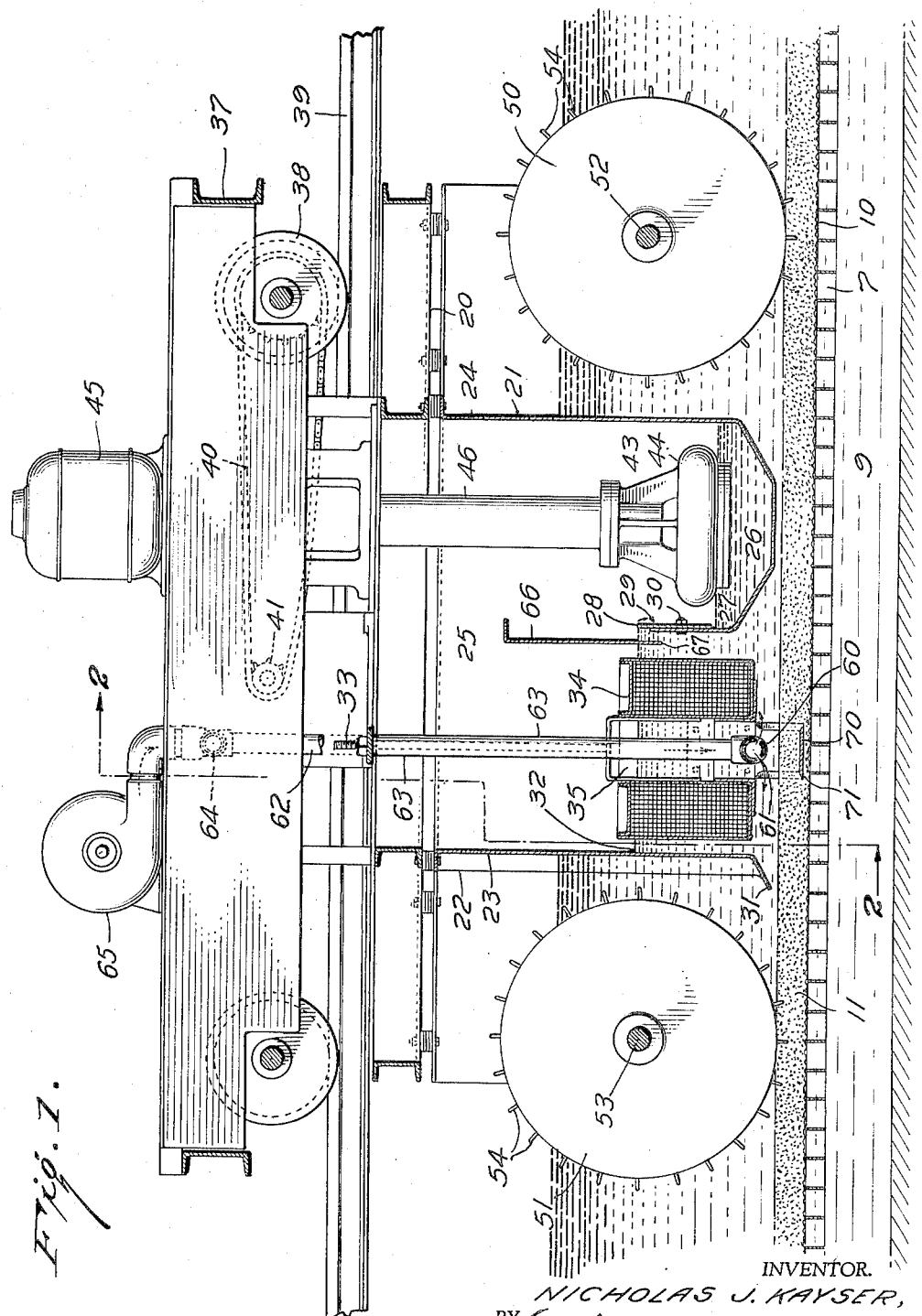
Fig. 1 is a longitudinal section of a filter and cleaner of the Laughlin type, to which an embodiment of the invention is applied.
Figure 2:
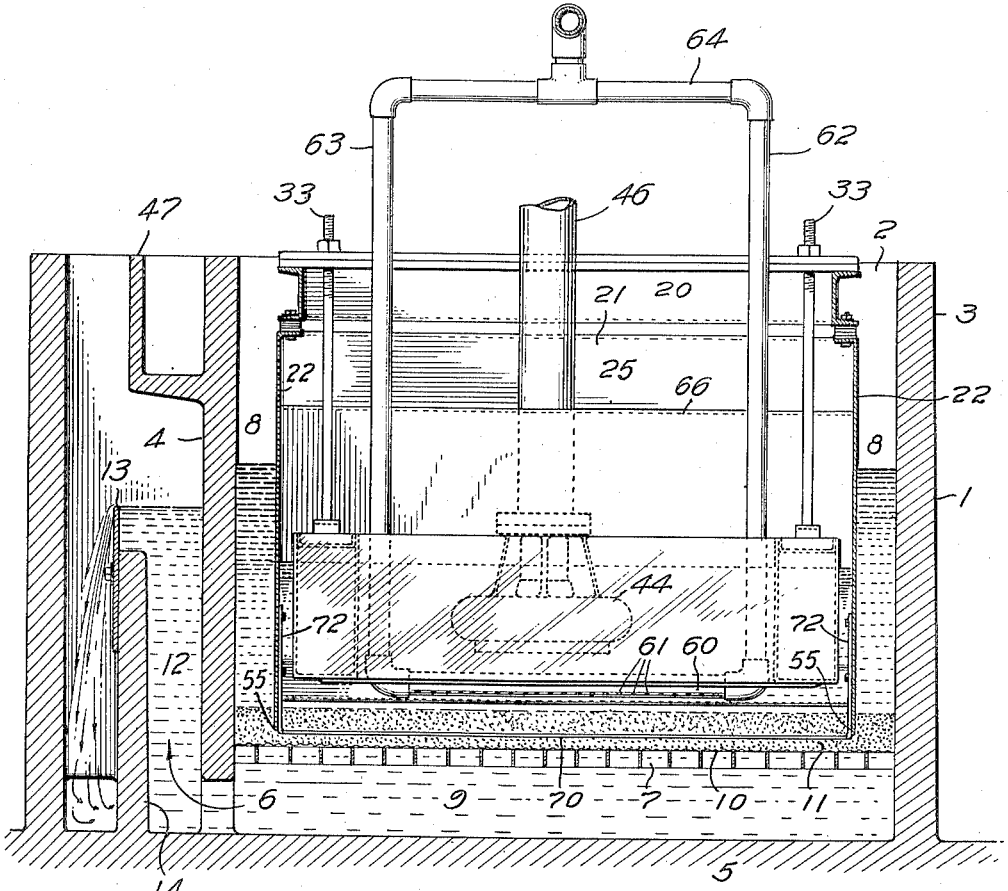
Fig. 2 is a vertical section on the line 2—2 of Fig. 1.

Referring to Figs. 1 and 2, a filter of the downflow type, indicated generally by reference numeral 1, is illustrated. This filter comprises a rectangular or circular filter canal 2 formed between side walls 3 and 4 and a bottom 5 provided with a submerged effluent channel 6 and an upper influent channel, not shown. A filter bed support 7 in the form of a rigid bronze grid or the like is affixed to the side walls of the filter canal 2 some distance above the bottom, thereby dividing the canal into an upper influent passage 8 and a lower effluent passage 9. Upon the grid 7 is a fine screen 10 of copper or bronze, and on this screen is a filter bed 11 of magnetic sand such as magnetite of 20 to 60 mesh in size.

An effluent channel 12, provided with an adjustable control weir 13, is shown on Fig. 2 of the drawings as being formed between the side wall 4 of the filter canal and an outer wall 14. This effluent channel and control weir is an important feature of the Laughlin downflow filtration system, but it should be understood that it is shown in its present position only for purposes of illustration. In large installations the outflow channel 6 may well be a pipe or conduit several hundred feet long, and the channel 12 and control weir 13 may be at any desired distance from the filter itself. The important function of these elements is that they serve to create and control the reverse flow or "back head" that causes the wash water to flow upwardly through the filter bed when the cleaner is in operation, and the hydrostatic pressure which they create may be applied over any distance.

The cleaning device 20 consists generally of a caisson or cleaner tank 21 having side walls 22, a forward cleaner partition 23 and a rear cleaner partition 24, the spaces between the side walls and the front and rear partitions constituting a cleaner caisson 25. This caisson contains a chamber 43 which is formed between the rear partition 24 and a forward extension thereof constituting a bottom plate 26 and an upwardly extending baffle 27 having an overflow edge 28 extending across the full width of the caisson between the side walls 22. In order to permit regulation of the water level within the caisson, the overflow edge 28 may be effectively raised or lowered by means of an adjustable weir plate 29, which in the modification shown is attached to the baffle 27 by nuts and bolts 30. The forward cleaner partition 23 is preferably inclined outwardly at its lower edge as at 31 and terminates above the level of the filter bed.

It will be seen that the space between the forward cleaner partition 23 and the baffle 27 constitutes a restricted neck or opening 32 which forms an inlet passage for the flow of wash water from the filter into the chamber 43 by way of the overflow edge 28. Within this neck is mounted as by rods 33 an electromagnet 34 for creating a localized zone of disturbance or agitation in the sand of the filter bed. This electromagnet is in the form of a solenoid having a vertical hollow central core or slot 35 through which wash water may pass when the electromagnet is in operation.

The cleaning mechanism is supported by a travelling carriage 37 which is mounted on wheels 38 rolling on a track 39 above the filter canal. It is understood, of course, that in the case of filters operating on or around a central clarification tank, a rotatable supporting truss may be used as is well known in the art, but as this forms no part of the present invention, it is not illustrated. In the modification illustrated the carriage 37 is provided with a chain drive 40 operating from a central sprocket 41 and driven by an electric motor and suitable reduction gears which are not shown. The solenoid 35 is intermittently energized by a suitable timer mechanism so that it is alternately energized and de-energized several times a minute, while the starting switch of the motor is preferably controlled by a float inserted in the influent channel of the filter. These control features form no part of the present invention and accordingly they are not illustrated in the drawings.

Within the caisson 25, and preferably located near the bottom of the chamber 43 is a pump 44 which is driven by an electric motor 45 mounted on the carriage 37. The pump 45 discharges wash water collecting in the chamber 43 through a discharge pipe 46 which empties into a wash water launder 47 carried by the side wall 4 of the filter canal. From the launder the wash water may be separately collected for treatment with chemicals, or it may be returned to the influent channel of a sedimentation tank, the effluent from which discharges into the influent channel of the filter canal 2.

In order to prevent leakage of water into the caisson, the cleaner tank is preferably provided with rotary sealing drums 50 and 51 mounted on axles 52 and 53 which are journalled in the side walls 22 of the caisson. These drums are provided with cleats 54 which penetrate a short distance into the sand of the filter bed and constitute a transverse seal to prevent the leakage or infiltration of water. The drums 50 and 51 rest on the surface of the filter bed and make a rolling contact therewith, thus preventing displacement of the sand of the filter as the cleaner caisson moves back and forth over it. The side walls 22 of the cleaner caisson are extended downwardly into the sand of the filter as at 55 and constitute a longitudinal seal therefor, while leakage between the ends of the drums and the side walls 22 is prevented by suitable vertical seals in the form of wipers. These sealing devices are not claimed per se since they constitute the subject matter of an application of Charles E. Fraser, Serial No. 152,771, filed July 9, 1937, but they constitute an important corollary feature of the present invention and cooperate with the novel principle of air introduction which will now be described.

As has been stated, the operation of the cleaner depends upon the creation by the electromagnet 34 of an area of lessened resistance in the sand of the filter bed 11. When the electromagnet 34 is energized, it lifts the sand of the filter bed and creates an area of increased permeability through which a stream of wash water is forced from the opposite side of the filter. Referring to Fig. 2 of the drawings, it will be seen that the rise of the wash water through the area of lessened resistance in the filter is caused by the difference in level between the water in the effluent channel 12 as determined by the control weir 13 and the water level in the caisson 21 as determined by the weir plate 29.

It is an object of the present invention to decrease the specific gravity of the stream of wash water as it rises above the level of the filter bed by injecting air into it, preferably in a large number of fine streams. I have found that such an injection of air into the wash water will not only result in a stronger upward flow, but will reduce and in many cases completely prevent the existence of downward currents which would otherwise carry dirty wash water from the caisson down into the filtered effluent. By injecting sufficient air into the space beneath the electromagnet, the entire neck 32 may be filled with air bubbles and the specific gravity therein may be reduced by as much as half. Under these circumstances, it is impossible for dirty wash water to flow downwardly through the opening in the filter bed created by the electromagnet. However, it is not always necessary to aerate the entire volume of dirty water in the neck 32, for aeration of the column of water in the core or slot 35 of the solenoid is frequently sufficient.

In Figs. 1 and 2 of the drawings, I have shown one embodiment of the invention which operates to introduce air into the rising stream of wash water. This consists of a pipe 60 provided with perforations 61 in its sides, and connected by way of vertical pipes 62 and 63 with a header 64 which is in turn connected with the outlet of a motor driven fan or air compressor 65. The pipe 60 is mounted in the center of the slot 35 of the solenoid, and the perforations 61 may be so adjusted as to direct streams of air into the rising current of wash water as it flows around the pipe 60 on its way up the slot. This arrangement operates to keep the slot 35 always filled with a column of bubbles or froth which, being much lighter than the incoming liquid, will not flow down into or mix with it. By increasing the air pressure, the currents of wash water flowing around the sides of the solenoid can also be aerated, and the pipe 60 may therefore be likened to a non-return valve which permits the upward flow of wash water into the neck 32 but effectively prevents its return. By reason of the decreased weight of the column of liquid in the neck 32, the effective operating head of water in the effluent channel 12 is also improved, for there is less weight of water in the neck 32 to counterbalance it.

When a cleaner provided with a pneumatic air lift in accordance with the present invention is operated on a filter of fine sand, there is sometimes a tendency for the water to carry sand upwardly with it. For this reason, there is provided a vertical baffle 66 for separating sand from the wash water before it passes over the weir plate 29 into the chamber 43. The column of water rising in the neck 32 must pass down under the lower edge 67 of this baffle before passing over the weir plate 29 and this serves effectively to cause separation of the sand.

While the principle of air diffusion can be applied to any type of cleaner in which a stream of water is caused to flow upwardly through the filter bed, I have found that it is of particular advantage for use in cleaners equipped with a sealing plate as described in the Laughlin application above referred to, and such a sealing plate is illustrated in Figs. 1 and 2 of the drawings. In these figures the plate 70, having sharpened edges as at 71, is attached to the side walls 22 of the cleaner tank as by bolts 72 and is adapted to travel through the sand of the filter bed a short distance above the bottom thereof. By reason of the increased operating head resulting from the diffusion of air into the water in the neck 32, the resistance created by this sealing plate may be effectively offset, and a satisfactory upward flow of wash water may be obtained.

Figure 3:
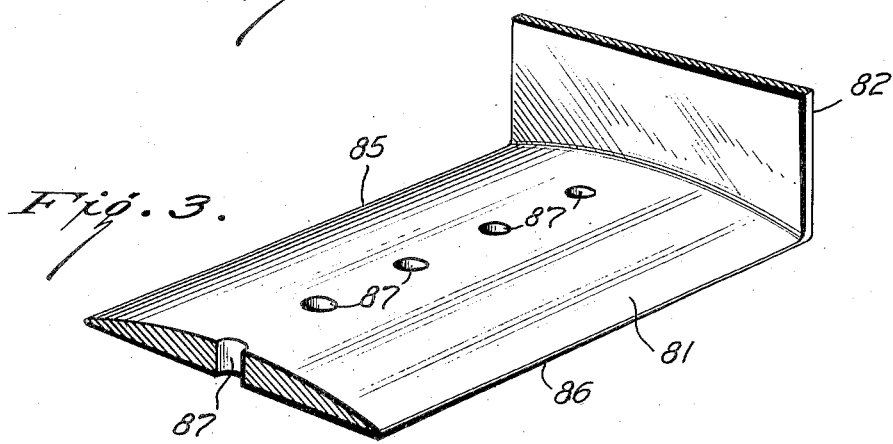

I have also found as another feature of the invention that an even better flow of wash water may be obtained while avoiding the danger of contamination of the effluent by providing a continuous slot or a plurality of of perforations in the central part of the sealing plate. In Fig. 3 I have illustrated one embodiment of this feature of the invention in which a sealing plate 81 having upturned ends 82 for attachment to the caisson, is formed with feathered or sharpened edges 85 and 86. Between the ends 82 are perforations 87 which permit the upward flow of wash water therethrough, but by reason of its restricted area, no downward flow is possible.

In the modification of Fig. 4 an embodiment of the invention is shown in which the functions of an air conduit and a sealing plate are combined. In this modification, the plate indicated generally at 101 is a hollow block having a flat bottom 102 and an arcuate top 103. Upturned end plates 104 are provided for attachment to the cleaner caisson in the same manner as illustrated in Fig. 2, but the plate is intended to combine the functions of the part 70 and the perforated pipe 60 shown in that figure.

For this purpose, the plate 101 is provided with an inner air conduit 105 from which a large number of small perforations 106 lead to the upper surface. The air conduit 105 is joined at each end of the plate with upturned air pipes 107 which, when the plate is attached to the cleaner, are adapted to be attached to the vertical air pipes 62 and 63. In operation, this modification of the invention serves to aerate the wash water as it passes around the sealing plate 101, and the formation of the column of bubbles takes place within the filter bed itself.

In Figs. 6 and 7, a modified form of sealing plate is shown at 108 having a longitudinally extending slot 109 therein covered by a movable valve member 110. The operation of this plate is clearly illustrated in Fig. 5 in which it is to be noted that as the thickness of the filter bed 11 is lessened in the zone of agitation, there is a tendency for the clean, filtered effluent to back flow against the bottom of the plate 108 and through the slot 109, thereby raising the valve 110 on its pins 111. This filtered effluent consequently serves the purpose of washing the dirty filtered sand and passes upwardly through the inlet to the wash water discharge as above described. It is to be noted that any tendency for the unfiltered liquid to flow down through the slot 109 and thus contaminate the filtered effluent is prevented because under these circumstances, the valve 110 will fall of its own weight and thus close the slot 109 or this action will take place under the impulse of the flow of liquid in that direction.

As a result, the modified form of valve plate shown in Figs. 5, 6 and 7 consists in permitting an upflow of filtered effluent for filter bed cleaning purposes in the zone of agitation, while at the same time, preventing downflow at that point and contamination of the clean filtered liquid.

While the invention has been shown and described with particular reference to specific embodiments, yet it is not to be limited thereto but is to be construed broadly and restricted only by the scope of the claims.

I claim:

1. A traveling cleaner for sand filters comprising in combination, a cleaner caisson adapted to move over successive portions of the filter bed, a chamber in said caisson for receiving wash water from the filter, a water inlet passage from the filter to said chamber, and a hollow member having an aperture therein, in the water inlet passage and means for ejecting air out of said aperture into the water in said inlet and a sealing slate below the hollow member.

2. A traveling cleaner for filters of magnetic sand comprising in combination, a cleaner caisson adapted to move over the filter bed and having a chamber for receiving wash water from the filter, a wash water inlet passage to the chamber from the filter, an electromagnet in said inlet for producing a zone of agitation in the filter material, and a hollow member having an aperture therein, in the water inlet passage and means for ejecting air out of said aperture into the water entering said inlet.

3. In a traveling cleaner for sand filters of magnetic material, in combination, a filter bed of magnetic material, an electromagnet for creating a zone of agitation in the filter, and a hollow member having an aperture therein, in the zone of agitation, and means for ejecting air out of said aperture and aerating the water in said zone of agitation.

4. A traveling cleaner for filters of magnetic sand comprising in combination, a cleaner caisson adapted to move over the filter bed and having a chamber for receiving wash water from the filter, a wash water inlet to the chamber from the filter, a solenoid having a vertical slot therein located in said inlet, and a hollow member having an aperture therein, in the water inlet passage and means for ejecting air out of said aperture into the water entering said slot.

5. A clarification filter of the downflow type comprising in combination, a filter including a filter bed support, a filter bed of magnetic sand on said support, a liquid inlet above and a liquid outlet below said filter bed, a cleaning device adapted to travel over said filter bed, said device including an electromagnet for creating a localized zone of agitation of the sand in the filter, a chamber for receiving wash water from the zone of agitation and a hollow member having an aperture therein, in the water inlet passage and means for ejecting air out of said aperture into the wash water under said electromagnet.

NICHOLAS J. KAYSER.